United States Patent
Staton et al.

(10) Patent No.: US 10,861,399 B1
(45) Date of Patent: Dec. 8, 2020

(54) REFLECTIVE, TRANSMISSIVE, AND TRANSFLECTIVE STATIC PROGRAMMABLE EXHIBITS AND METHODS FOR USING SAME

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: NEWTONOID TECHNOLOGIES, L.L.C., Liberty, MO (US)

( * ) Notice: Subject to any disclaimer, the term of this patent is extended or adjusted under 35 U.S.C. 154(b) by 0 days.

(21) Appl. No.: 16/702,052

(22) Filed: Dec. 3, 2019

Related U.S. Application Data

(63) Continuation of application No. 16/521,191, filed on Jul. 24, 2019, now Pat. No. 10,497,325.

(60) Provisional application No. 62/702,414, filed on Jul. 24, 2018.

(51) Int. Cl.
*G09G 3/34* (2006.01)
*G02F 1/163* (2006.01)
*F21S 43/20* (2018.01)
*G06Q 20/34* (2012.01)
*G09F 13/00* (2006.01)
*F21W 103/35* (2018.01)
*G06K 19/077* (2006.01)
*G09G 3/19* (2006.01)
*G09G 3/38* (2006.01)

(52) U.S. Cl.
CPC .......... *G09G 3/3433* (2013.01); *F21S 43/255* (2018.01); *G02F 1/163* (2013.01); *G06K 19/07703* (2013.01); *G06Q 20/357* (2013.01); *G09G 3/19* (2013.01); *G09G 3/38* (2013.01); *F21W 2103/35* (2018.01); *G09F 13/00* (2013.01)

(58) Field of Classification Search
CPC . G09G 3/3433; F21W 2103/35; F21S 43/255; G06G 20/34–35765; G06K 19/07703–07707
See application file for complete search history.

(56) References Cited

U.S. PATENT DOCUMENTS

| | | | |
|---|---|---|---|
| 7,983,718 B1* | 7/2011 | Roka | H04M 1/72588 455/566 |
| 8,711,102 B2* | 4/2014 | Kong | G06F 3/04817 345/173 |
| 10,084,501 B1* | 9/2018 | Coverstone | G06F 3/0412 |
| 10,190,743 B2* | 1/2019 | Hertel | F21V 14/003 |
| 2004/0184596 A1* | 9/2004 | Choi | H04M 1/27475 379/355.01 |
| 2005/0134461 A1* | 6/2005 | Gelbman | G06K 19/0717 340/572.8 |
| 2006/0211384 A1* | 9/2006 | Kayzar | H04M 1/0202 455/90.3 |

(Continued)

*Primary Examiner* — Patrick F Marinelli
(74) *Attorney, Agent, or Firm* — Avant Law Group, LLC

(57) ABSTRACT

According to one embodiment, a color changing display includes a housing, a cover cooperatively coupled to the housing, a light panel, and a color display panel. The light panel and the color display panel are positioned between the housing and the cover. The light panel and the colored display panel are each selectively activated to operate in at least one of: a reflective mode, a transmissive mode, and a transflective mode.

20 Claims, 9 Drawing Sheets

(56) References Cited

U.S. PATENT DOCUMENTS

| | | | |
|---|---|---|---|
| 2008/0309617 A1* | 12/2008 | Kong | G06F 3/0482 |
| | | | 345/157 |
| 2012/0052929 A1* | 3/2012 | Thammasouk | G06F 1/1626 |
| | | | 455/575.1 |
| 2012/0113667 A1* | 5/2012 | Brandt | B60Q 1/302 |
| | | | 362/541 |
| 2013/0278900 A1* | 10/2013 | Hertel | G03B 21/10 |
| | | | 353/28 |
| 2014/0215404 A1* | 7/2014 | Kong | G06F 3/04817 |
| | | | 715/838 |
| 2014/0239068 A1* | 8/2014 | Park | G06K 19/07707 |
| | | | 235/449 |
| 2016/0239829 A1* | 8/2016 | Olson | G06Q 20/354 |
| 2016/0260088 A1* | 9/2016 | Olson | G06K 19/06206 |
| 2019/0113201 A1* | 4/2019 | Hertel | G02F 1/167 |
| 2019/0113821 A1* | 4/2019 | Paolini, Jr. | G02F 1/1676 |
| 2019/0197520 A1* | 6/2019 | Wyatt | G06Q 20/223 |
| 2019/0213579 A1* | 7/2019 | Zarakas | G06Q 20/04 |
| 2020/0125914 A1* | 4/2020 | Wurmfeld | G06K 19/07707 |

\* cited by examiner

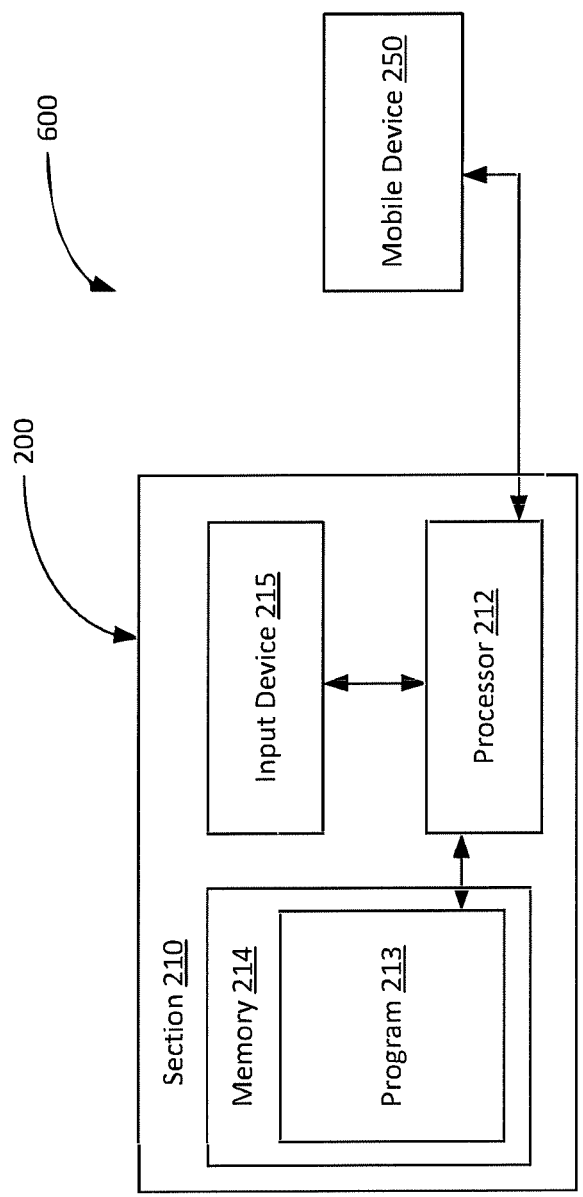

REFLECTIVE, TRANSMISSIVE, AND TRANSFLECTIVE STATIC PROGRAMMABLE EXHIBITS AND METHODS FOR USING SAME

CROSS-REFERENCE TO RELATED APPLICATIONS

This application is a continuation of U.S. patent application Ser. No. 16/521,191, filed Jul. 24, 2019, which is pending and which claims priority to U.S. Provisional Patent Application No. 62/702,414, filed Jul. 24, 2018, the disclosures of each of which is incorporated by reference herein in its entirety.

BACKGROUND

People are constantly presented with data which they use to interpret the world around them. Data can include objects in an environment, and often also includes signs, displays, or exhibits which are designed to present specific data to the viewer. For humans, this often includes various forms of advertisements and/or informational graphics. Informational graphics can come in numerous forms, several of which include but are not limited to traffic signals, lights designed to evoke action (e.g., brake lights, blinkers, security lights, etc.), computer graphics (e.g., such as an interface that one would encounter on a smart watch or other mobile device), among others. Unfortunately, signs are often designed to provide information based on the worst-case viewing scenario. For example, if it is desirable for the viewer to be able to see the sign at night, then the sign is designed with night-time in mind. This means that the sign is likely not tailored to provide the user with the best view at all times, for example, during the day. Accordingly, signs or exhibits that can be at any time optionally transmissive, reflective, and/or transflective are desirable in order to provide a user with the ability to view information in all viewing conditions which has previously been unavailable.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to one embodiment, a color changing display includes a housing, a cover cooperatively coupled to the housing, a light panel, and a color display panel. The light panel and the color display panel are positioned between the housing and the cover. The light panel and the colored display panel are each selectively activated to operate in at least one of: a reflective mode, a transmissive mode, and a transflective mode.

According to another embodiment, a color changing display system has a display apparatus having at least one section defining a color display panel. The display system further includes a processor communicatively coupled to the display apparatus and non-transitory computer memory. The computer memory has programming that, when executed by the processor, causes the color display panel to be selectively activated to provide an alert to a user.

According to still another embodiment, a layered display has a first panel. Adhesive is applied to the first panel, and supports a substantially transparent panel on a first side of the transparent panel. Adhesive is applied on a second side of the substantially transparent panel, and supports a tile. A light is disposed adjacent a portion of a perimeter of the substantially transparent panel such that activation of the light illuminates the substantially transparent panel, when activated, at least a portion of the light from the illuminated substantially transparent panel is viewable through the tile.

BRIEF DESCRIPTION OF THE DRAWINGS

FIG. 6 is a schematic diagram of an exhibit system incorporating the exhibit of FIG. 2.

DETAILED DESCRIPTION

Figures 1A, 1B:
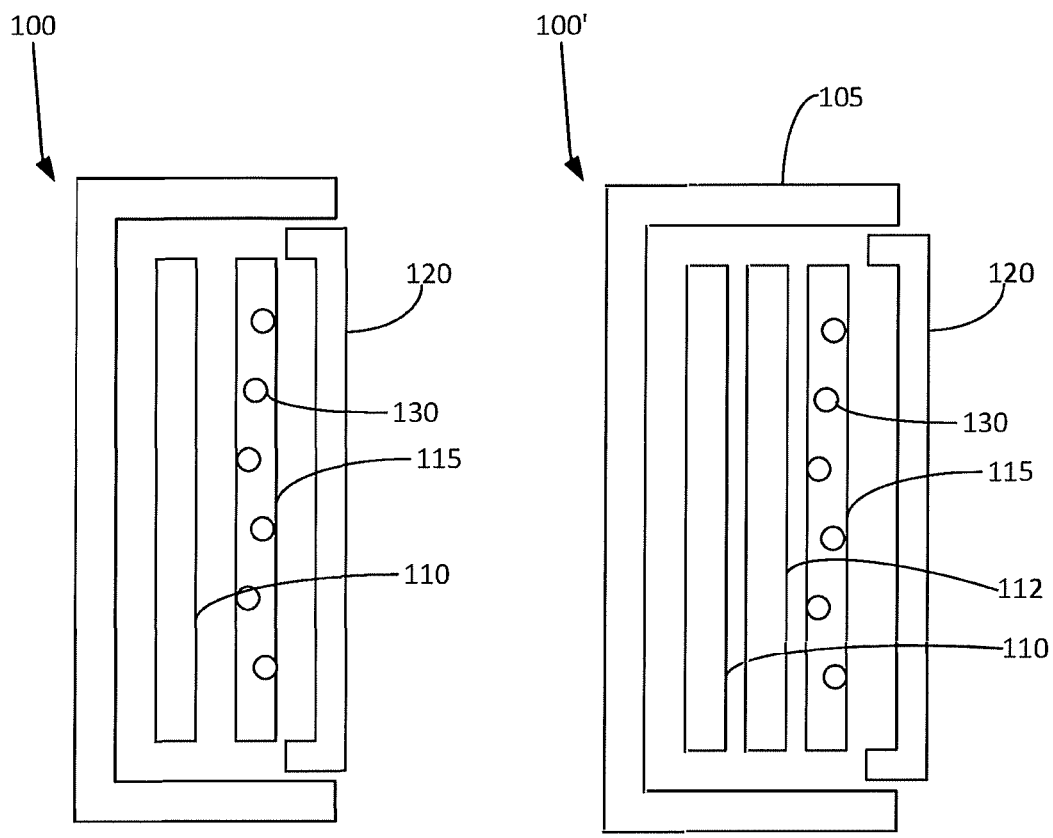
FIG. 1A is a diagram of a system for exhibiting information according to an embodiment of the invention.
FIG. 1B is a diagram of a system for exhibiting information according to another embodiment of the invention.

Embodiments of reflective, transmissive, and/or transflective exhibits and/or signs are described herein. In embodiments, a transflective exhibit or sign is configured as a signal or light, such as a brake light, a blinker, and the like. FIG. 1A illustrates an embodiment of a transflective indicator 100 that includes a housing 105 and a transparent or substantially transparent cover 120. In embodiments, the cover 120 may be clear or substantially clear (e.g., without color), although this is not a requirement. Within the housing 105, a light panel 110 is positioned behind a colored display panel 115. The light panel 110 may include one or more lights, such as an electroluminescent (EL) lamp, liquid crystal display (LCD), one or more light emitting diodes (LEDs), organic light emitting diodes (OLEDs), halogen lights, incandescent lights, carbon nanotubes (CNT), et cetera. The colored display panel 115 may be such that a portion of the light from the light panel 110 can pass through the colored display panel 115. In embodiments, about 10-90% of the light from the light panel 110 is allowed to pass through the colored display panel 115. In some embodiments, about 20-90% of the light from the light panel 110 passes through the colored display panel 115. In still other embodiments, about 30-90%, about 40-90%, about 50-90%, about 60-90%, about 70-90%, or about 80-90% of the light passes through the colored display panel 115.

Figure 1C:
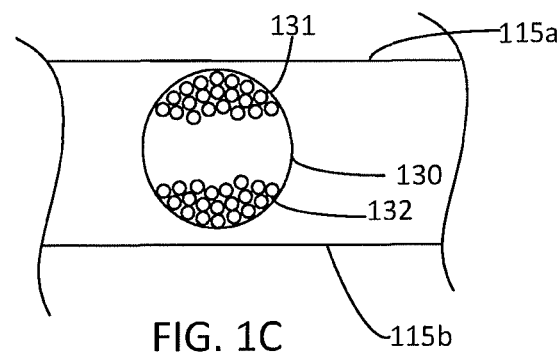
FIG. 1C is a close-up side view of a color-changing panel for exhibiting information according to an embodiment of the invention.

The colored display panel 115 may have colored pigment on both sides thereof. Alternately, the colored display panel 115 may be a smart panel, such as a static programmable electro-chromic (SPEC) particle matrix (e.g. electronic paper) display panel. The electronic paper display panel comprises a plurality of SPEC particles 130, embodied in transparent spheres 140 having ink therein—a first color pigment in positively (or negatively) charged spheres 131, and a second color pigment in negatively (or positively) charged spheres 132, as illustrated in FIG. 1C. The SPEC particles 130 are configured such that the particles 130 switch between a first side of the panel 115a and a second side of the panel 115b as is known in the art. When the first-color particles 131 are at the first side of the panel 115a, the second-color particles 132 at the second side of the panel 115b. And, when the second-color particles 132 are on the first side of the panel 115a, the first-color particles 131 are at the second side of the panel 115b. For example, the SPEC particles 130 may be configured to switch between red and white, yellow and white, blue and white, or any other colors. Additionally, particles 130 may be combined in such a way that many different colors may be displayed on the panel at any time.

The indicator 100 may receive power from any appropriate power source. The power source is configured to selectively illuminate the light panel 110 and/or switch the flashing display panel 115 from the first-color state to the second-color state or vice versa. In other words, the light panel 110 and the display panel 115 can be activated individually, or simultaneously, as is desirable. Further understanding of the indicator 100 shall be understood from the examples provided below, which are intended to be illustrative only and those of skill in the art shall appreciate that the invention is not limited to the illustrations set forth herein.

In one embodiment, the indicator 100 is configured as a brake light for a vehicle. Traditionally, brake lights in vehicles consist of a housing with a light (e.g., an incandescent bulb). A red transparent cover is situated over the housing such that, when the light is activated, the red cover appears to glow red. This glowing red is an indication that the vehicle is slowing down, and drivers are accustomed to associating the color red with a need to slow down. Unfortunately, vehicle accidents are a common occurrence, and often the cover of a brake light is damaged. When this occurs, the light may still be operational, but in the absence of the red cover, rather than glowing red, the light merely shines into the eyes of nearby drivers. Moreover, light bulbs routinely burn out, in which case the brake light serves little purpose for nearby drivers. And still further, even in peak operating condition, sunlight may prevent nearby drivers from appreciating that the brake light is activated. Drivers would certainly benefit from an exhibit or sign that does not rely on vehicle parts that are subject to regular brake down.

The brake light 100 may be incorporated as a supplementary brake light which does not otherwise affect the function of traditional brake lights on the vehicle. Alternately, the brake light 100 may be configured to altogether replace traditional brake lights on the vehicle to provide the vehicle with the added fail-safe redundant functionality of the brake light 100 as described herein.

The brake light 100 may receive power from the power system of the vehicle in the same manner as a traditional brake light. Where the brake light 100 is provided as a supplementary device, the brake light 100 may tap into the existing power supply to the existing brake lights. Thus, when a driver presses on the brake, activating the existing brake lights, the brake light 100 may also be activated. Likewise, when a user removes his foot from the brake, thereby deactivating the existing brake lights, the brake light 100 is also deactivated.

In embodiments, the system 100 is operable in a "light only" or "transmissive" mode. In the transmissive mode, the light panel 110 may be activated while the colored display panel 115 remains inactivated (e.g., shows a neutral color, such as white). In some embodiments, the system is operable in a "color only" or "reflective" mode. In the reflective mode, the colored display panel 115 may be activated (e.g., switch from the first-color state to the second-color state on the first side 115a of the panel 115) while the light panel 110 remains deactivated. Still in other embodiments, the system is operable in a "transflective" mode. Here, the colored-display panel 115 may be activated concurrently with the light panel 110. In other words, in the transflective mode, the light panel 110 is activated such that light emanates therefrom, and at the same time, the colored display panel 115 is activated such that the second-color state is presented on the first side 115a and the first-color state is presented on the second side 115b. Optionally, a switch may be provided to allow a user to switch between the transmissive, reflective, and transflective modes.

In the reflective-only mode, the color-display panel 115 is configured to present a particular designated color (e.g., the second-color state) to a viewer upon activation. Absent activation, a viewer may not see the particular designated color, but would instead see the neutral color. For example, in the case of a brake light, activation of the color-display panel 115 may cause the color-display panel 115 to present the color red to a viewer. When the color-display panel 115 is not activated, however, viewers may see white. This is because, as described above, the cover 120 may be without color. Because the actual of the color-display panel 115 changes, even without a colored cover 120 (contrary to traditional brake lights), or a working light bulb, viewers will still be able to receive an indication that the vehicle is slowing down because the color-display panel 115 will show the color red.

As described above, activation of the color-display panel 115 occurs when a driver presses on the brakes, but the light panel 110 remains deactivated. Contrary to existing brake lights, because the user is presented with a color other than red when the vehicle brake is not engaged, the light panel 110 is technically unnecessary. When the vehicle brake is not engaged, nearby drivers will certainly know because they will not see the color red in the area of the brake light 100. And when the vehicle brake is engaged, nearby drivers will certainly know because red will be present in the area of the brake light 100. Even during periods of low light, the light from the head lamps of nearby drivers will reflect off of and illuminate the brake light 100 to allow the drivers to ascertain the need to slow down near the vehicle.

However, the safety of drivers is of utmost importance, and therefore it may be desirable for the light panel 110 to be activated by engaging the vehicle's brake to ensure that nearby drivers are alerted to the vehicle's slow down. In the transmissive-only mode, the light panel 110 may be activated when the brake is engaged by a driver, while the color-display panel 115 remains deactivated. Because the color-display panel 115 is configured to allow light to pass through, activation of the light panel 110 causes viewers to see the particular designated color (e.g., red), albeit somewhat muted, even though the color-display panel 115 shows the first color, or default state (e.g., white) to the viewer. Accordingly, by activating the light panel 110 upon engagement of the brake, even in the event that the color-display panel 115 malfunctions, nearby drivers are alerted to the vehicle's slow down.

Preferably, the brake light 100 operates in a transflective mode. In the transflective mode, both the light panel 110 and the color-display panel 115 are activated upon engagement of the vehicle brake. Thus, the light panel 110 provides illumination to the color-display panel 115, and the color-display panel 115 presents the second-color state (e.g., red) to viewers. Together, activation of the color-display panel 115 and the light panel 110 provides a vibrant indication to viewers that the vehicle is slowing down. Moreover, failure of either the light panel 110 or the color-display panel 115 is not catastrophic, as the brake light 100 can operate in the absence of one of the light panel 110 or the color-display panel 115, as described above.

It is noteworthy that in some embodiments the transmissive mode may override the reflective mode or vice versa. This override feature would allow for fail-safe operation even in situations where the primary mode functions fail to operate properly, for example, where the light panel 110 fails to activate, or where the color-display panel 115 fails to switch to the second-color state. Accordingly, sensors operable to detect the failure of various components of the system 100, and to initiate a mode override may be disposed at or near the system 100. When the sensor determines that the light panel 110 and/or the color-display panel 115 is not activated in response to the driver pressing on the brake, the sensor can alert the system 100 and the other of the light panel 110 and/or the color-display panel 115 can be activated.

Moving on, FIG. 1B shows a transflective sign or exhibit 100' which is substantially similar to the sign 100 except as is shown and described herein. In FIG. 1B, the sign 100' further includes a gel filter 112. The gel filter 112 is a transparent colored filter that may help to color the light from the light panel 110, similar to the function of the covering of a traditional brake light. In FIG. 1B, the gel filter 112 is shown between the light panel 110 and the color-display panel 115. However, it shall be understood by those of skill in the art that the gel filter 112 can also be disposed between the color-display panel 115 and the cover 120. In embodiments, the gel filter 112 may be red, to provide nearby viewers with a familiar view when looking at the brake light 100. However, it shall be understood that the gel filter 112 is optional.

Figure 2:
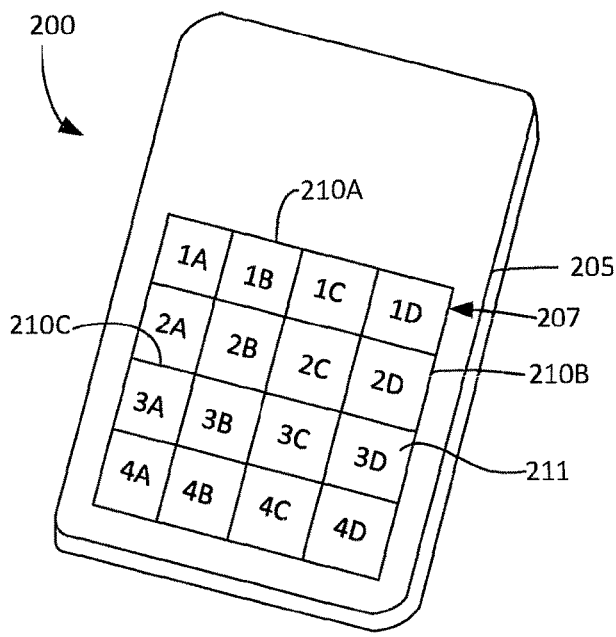
FIG. 2 illustrates an exhibit according to still another embodiment of the invention.

FIGS. 2, 3A-B, 4A-B, and 5A-C illustrate other embodiments of reflective, transmissive, and/or transflective signs or exhibits may take a variety of different configurations. More specifically, FIGS. 2, 3A-B, 4A-B, and 5A-C illustrate examples of segmented exhibits that can be reflective, transmissive, and/or transflective as described herein. FIG. 2 shows an exhibit 200 embodied as a case 205 for a mobile device, such as a computer or a mobile phone. The case 205 has a smart area 207, comprising one or more segments 210A, 210B, 210C (generally referred to herein as 210). Each segment 210 may comprise a color display panel 211. The color display panel 211 may, in embodiments, be a smart material, such as a SPEC particle matrix display as described above.

Each section 210 may be configured separately from the other section(s) 210 such that the sections 210 operate independently of one another. FIG. 6 is a schematic illustration of several components of a transflective system 600 which includes an exhibit 200 and a mobile device 250. Each section 210 has at least a processor 212 operable to execute a program 213 stored on memory 214. The processor 212 may be in communication, either through a wired connection or wirelessly, with a mobile device 250. In some embodiments, each of the sections 210 are communicatively coupled to one processor 212, which is operable to execute the program 213 to selectively activate each of the sections 210 individually based on information from the mobile device 250. It shall be understood by those of skill in the art that additional components and functionality may be further incorporated into the system 600 as is known in the art.

According to some embodiments, the case 205 for a mobile device 250 has just one section 210. The section 210 is configured to recognize when the mobile device receives an alert, such as a phone call, a text message, or a calendar reminder, for example. When the mobile device 250 receives the alert, the section 210 may be programmed to recognize a change in frequency from the mobile device (e.g., as the result of vibrations or sound generated by receipt of the alert). In embodiments, the mobile device 250 may be configured to emit, and the section 210 may be configured to recognize, notifications (e.g., vibrations, inaudible sounds, etc.) that are otherwise imperceptible to humans. In still other embodiments, the case 205 may link to the mobile device 250 (e.g., via plugging into the mobile device) to receive data therefrom. In any event, when the section 210 determines that the mobile device 250 has received an alert, the programming 213 via the processor 212, causes the color display panel 211 of the section 210 to activate, wherein the color display panel 211 switches from a default colored state to an alert state. In the alert state, the color display panel 211 may remain constant in the alert-colored state, or may "flash" between the default colored state and the alert-colored state. Regardless, the mobile device 250 may thus notify a user of an alert without disrupting the user or requiring the user to look at the screen of the mobile device 250.

In some embodiments, the section 210 may be activated only upon receipt of an alert from a specified contact or contacts. For example, a user may desire for the case 205 to exhibit the alert-colored state only when his or her children, parents, and/or work tries to contact the user, but not when other contacts attempt to contact the user. The user can thus easily and selectively identify an alert from a key contact, without being bombarded with alerts.

Once the section 210 is activated, it remains activated until reset by the user. The user may reset the section 210 by engaging with an input device 215. In FIG. 6, the input device 215 is shown as being part of the section 210; however, it shall be understood that the input device 215 does not have to be part of the section 210, and may be provided separate from the section 210. The input device 215 may be a sensor, for example, which is configured to sense a particular input from a user, such as a series of taps on the case 205 or a swipe of a finger across the section 210. The input required by the user to reset the section 210 can be preprogrammed by the user and stored in the memory 214. Thus, a user, having seen the activated section 210 in the alert state, may reset the section 210. When the section 210 is reset it returns to the default colored state and additional alerts may then be received. In other embodiments, the input device 215 may be an application on the mobile device 250 with which the user interacts to reset the section 210.

Because mobile devices 250 often receive multiple kinds of alerts, and often simultaneously, in some embodiments it may be preferable for the sign 200 to include multiple sections 210 (e.g., 210A, 201B, 210C, etc.). Each section 210 may be separately programmable to provide an output based on a specified output from the mobile device 250, such as a ring tone, vibration pattern, sound pattern, light pattern, display pattern, text message, network datagram, and/or other output. A user can thus easily distinguish between alerts, as each section 210 would provide a unique alert based on the user's alert preferences.

For example, in FIG. 2, the case 205 includes 16 sections 210, identified as columns 1-4, and rows A-D. However, fewer or additional sections 210 may be included with the sign 200 as is desired. Each section 210 may be individually programmed to activate upon receipt of a certain input. For example, a user may save four "favorite" contacts saved into his mobile device 250. Each contact may be assigned to a section 210 in row A (e.g., sections 1A, 2A, 3A, and 4A), and the appropriate section 210 may be individually programmed to recognize an output from the mobile device 250 for that particular individual. In embodiments, the alerts may be preprogrammed and stored in the memory 214. When one of the preprogrammed favorite contacts calls, the appropriate section 210 (e.g., section 2B) is activated, causing the section 210 to switch from the default colored state to an alert state. As noted above, the section 210 may remain in the alert state until it is reset by the user.

Other sections 210 may be programmed to switch to the alert state upon, for example, the presence of an unread voicemail or e-mail. One section 210 may be dedicated to providing an alert of an upcoming calendar appointment. Still another section 210 may be dedicated to alerting the user to an unread text message. Yet another section 210 may be programmed to alert the user to a downswing in the markets, or a breaking news story. Those of skill in the art shall understand that the sections 210 may be programmed to provide an alert for any output from the mobile device 250 that the user desires. Accordingly, the sign 200 may be personalized to each user to provide the user with the most information relevant and desirable to the user.

It shall be understood that the alert state for each section 210 may be customized (e.g., a different color) such that the user can easily identify the particular alert. As described above, the sections 210 may be reset by the user by engaging with the input device 215. The input device 215 may be configured to reset all sections 210 at once, or only a particular section 210 identified by the user. In embodiments, an input device 215 is provided for each section such that a user can tap (or swipe, or provide another input) the section 210 to reset that section without disrupting the alert(s) provided by other sections 210.

The power required for the display 200 is minimal, and may be provided directly from the mobile device 250. However, it shall be understood that the display 200 may be powered by any means now known or later developed, including by solar powered, battery powered, super-capacitor, etc. In embodiments, the display 200 is equipped to store energy (e.g., in a capacitor from exposure to light, sound, pressure, heat, vibration, or other transduced and harvested energy form) which may be used to selectively power the display 200.

Figure 3A:
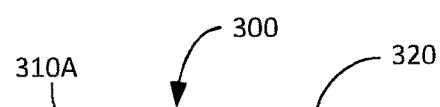
FIGS. 3A and 3B illustrate an exhibit according to a further embodiment of the invention.
Figure 3B:
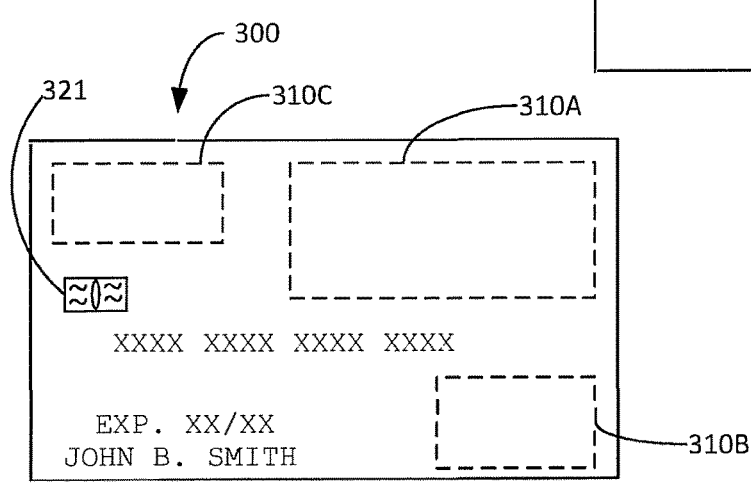
Figure 7:
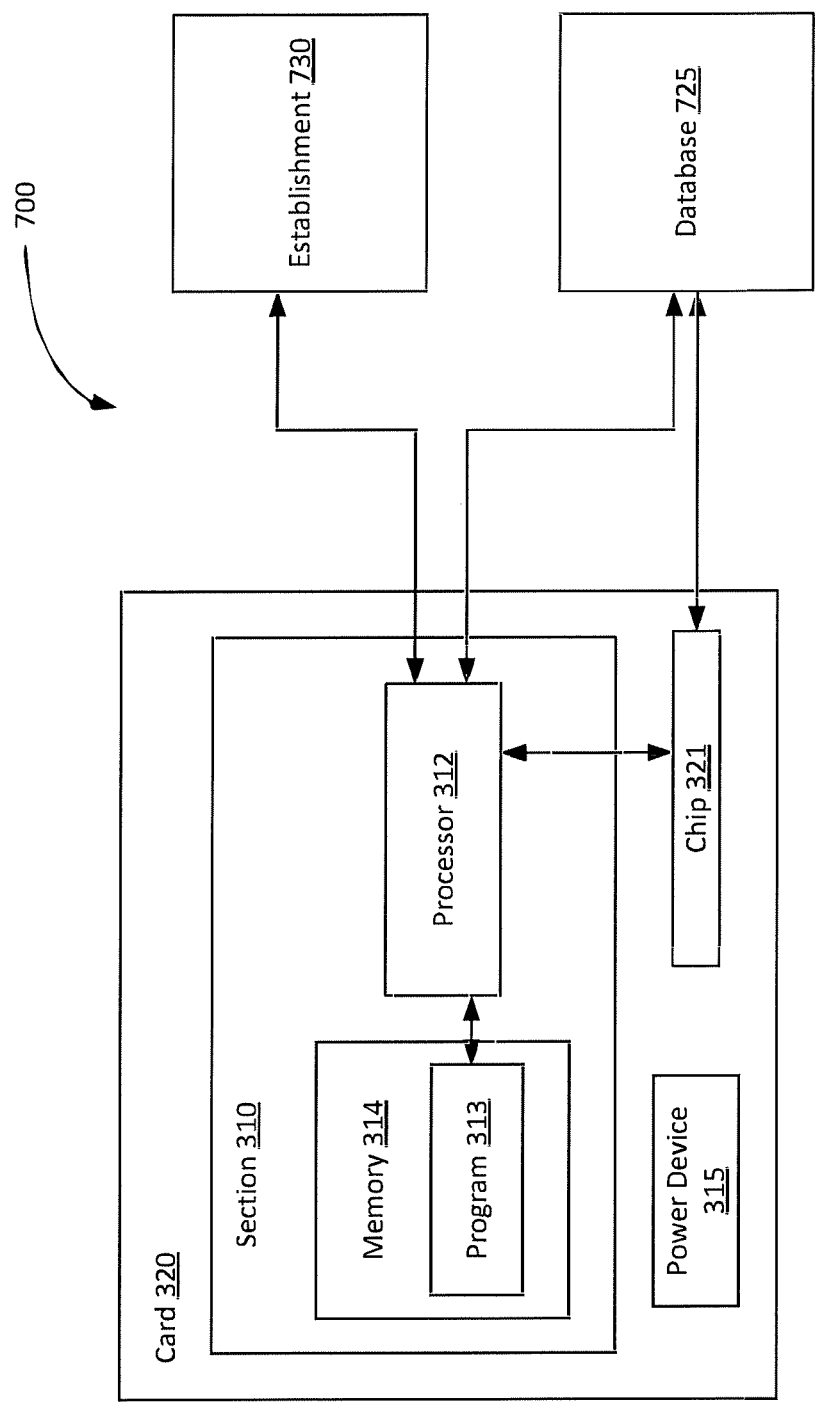
FIG. 7 is a schematic diagram of an exhibit system incorporating the display of claim FIGS. 3A and 3B.

In a further embodiment illustrated in FIGS. 3A and 3B, an exhibit 300 is configured as a bank card (e.g., credit or debit card), gift card, or other form of payment 320. The exhibit 300 is substantially similar to the exhibit 200 except as is shown and described or as would be inherent. Further, a system 700 embodying the exhibit 300 is shown in FIG. 7, and is substantially similar to the system 600 except as shown and described. Here, the exhibit 300 contains one or more sections 310A, 310B, and 310C (generally 310), which may be configured as a color display panel 311, similar to the color display panels 115 and 211 as described herein. The sections 310 may be configured to provide information to a user about an account associated with the form of payment 320. For example, one section 310 may be configured to alert the user of possible fraud associated with his account. Another section 310 may be configured to alert the user of a low or zero balance. Thus, the card 320 may be able to provide information regarding security alerts, card or account limits, and/or card deactivation status. In an embodiment, a green section 310 may indicate an "all clear" or "good" status. A yellow section 310 may indicate that the card owner needs to call the service center because of a potential problem. A red section 310 may alert the user to a known issue and therefore the user may be dissuaded from using the card 320. A blue section 310 may indicate the availability of a preset trigger limit. Of course, additional or alternative colors may be utilized and are considered within the scope of the invention. Further, the card 320 may contain additional, or fewer, sections 310.

Many cards are equipped with computer chips 321 for authenticating transactions with the cards. Accordingly, the sections 310 may receive power from the chip 321 for the purpose of generating the alert (e.g., switching from the default colored state to the alert state, and back). In embodiments, the processor 312 associated with the section 310 is in data communication with the chip 321, which provides the data necessary for the program 313 to determine whether to generate an alert. As is known in the art, the chip 321 may be in communication (e.g., over a wireless network, via a wired connection, or visible light communication (VLC)) with a database 725 (which may be one or more databases) to authenticate a transaction. The database 725 may further provide the chip 321 with relevant information which may be retrieved by the processor 321 and analyzed by the program 313 to generate an alert state. For example, when a user uses a card 320 having a chip 321, the user may insert the card 320 into a payment system. The chip 321 authenticates the transaction according to known procedures. At the same time, the chip 321 may retrieve or receive information from the database 725 (e.g., over a network) that the user's account has a low balance. The processor 312 receives this information and, together with the program 313, causes the relevant section 210 to switch from a default color state to an alert state. The alert state may retain its color status after removal of power due to the semi-permanent attribute features of the color reflective SPEC matrix layer. The alert states may also be used in conjunction with user alert status indication to improve security for credit card transactions based on evolving standards (e.g. Europay, Mastercard, Visa (EMV) and Payment Card Industry (PCI) compliance) including block-chain e-commerce (e.g. bitcoin) transaction validation.

Some cards 320 may not be equipped with a chip 321. Here, the card 320 may include a small battery 315 (or other energy harvesting and storage device) to provide the necessary power required to operate the system 700. Moreover, the processor 312 may be configured to communicate (e.g., over a network) directly with the database 725 (or multiple databases 725) to retrieve information about the card 320 or the account with which it is associated.

The processor 312 may also communicate (e.g., over the network) with nearby establishments 730 to identify promotions available to the user. Here, another section 310 may be configured to alert the user that a promotion is available (e.g., a coupon, sale, etc.). When the user is within a predetermined threshold of an establishment, the section 310 may be activated to alert the user. While the section 310 may be configured to provide human-readable information to the user (e.g., where the section 310 is configured as one or more seven-segment displays as described herein), the section 310 may simply change to the alert state such that the user knows to ask if there are coupons or sales that are relevant to the user's purchase. Consider, for example, a patron at a clothing store. When the patron takes out his or her card 320, a section 310 may be activated based on the processor's 312 communication with the store, alerting the patron to a particular sale or available coupon. The patron can then inquire about the sale before making his or her purchase in order to take advantage of any promotion that may apply to the transaction.

Figure 4A:
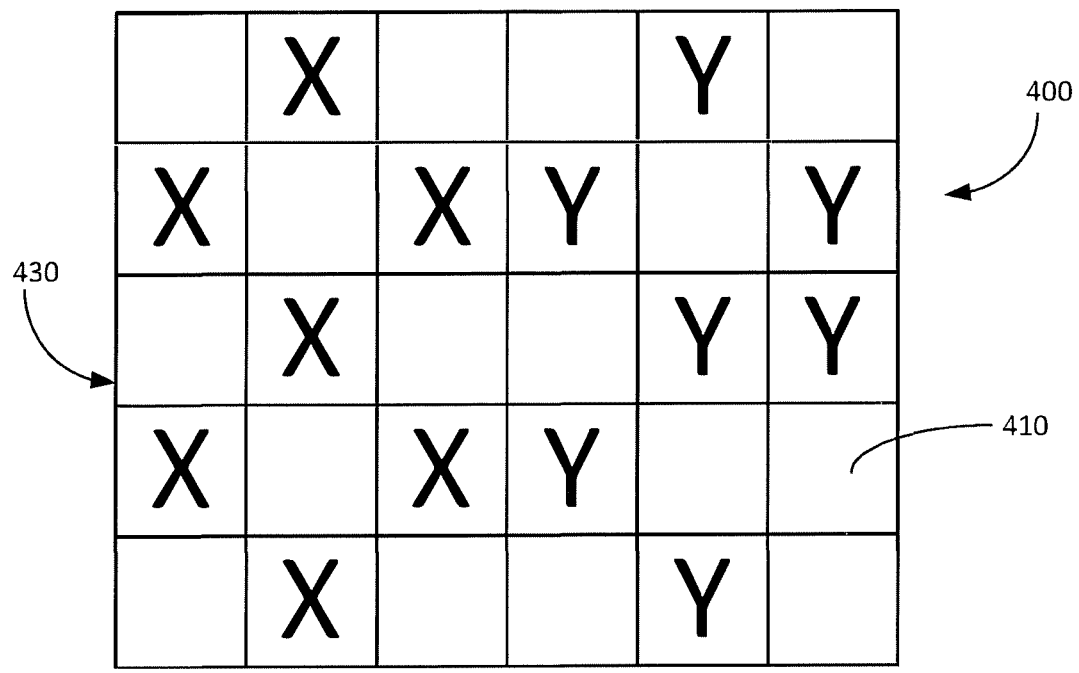
FIGS. 4A and 4B illustrate a 7-segment display or sign according to the embodiment of FIG. 2C.
Figure 4B:
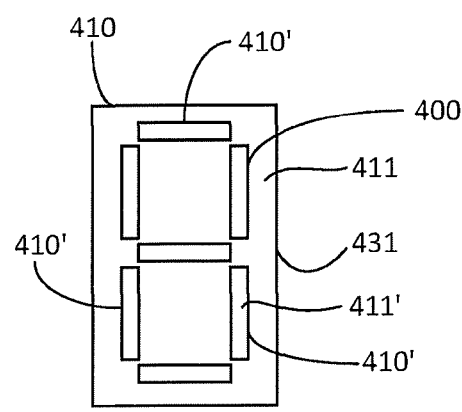

In a further embodiment illustrated in FIGS. 4A and 4B, an exhibit 400 is configured as a signboard (e.g., billboard) 430 having a plurality of sections 410. The exhibit 400 is substantially similar to the exhibits 200 and 300 except as shown and described herein, or as would be inherent. Each section 410 may be individually configured to operate independent of the other sections 410. In embodiments, as shown in FIG. 4B, one or more sections 410 (e.g., the sections having X's and Y's in FIG. 4A) may be further configured as a 7-segment display 431 having seven sections 410' (or other dot-matrix pixel configurations). The number of sections 410 can be greater or less than seven in any matrix or aspect ratio (e.g. 1×10, 5×7, 8×8, 640×480, 1920×1080, et cetera). The sections 410 and 410' may be configured as color display panels as described herein. In embodiments incorporating a 7-segment display 431, the area of the section 410 not corresponding to the sections 410' may include a color display panel 411 that is operable together with, or separate from, the color display panel(s) 411' forming the 7-segment display. In some embodiments, the color display panel 411 may have a different color scheme than the color display panel 411' such that, when activated, the viewer can easily see the segments 410'. In still other embodiments, the color display panels 411 and 411' may have the same, but opposite, color schemes. In other words, in the deactivated state the color display panel 411 may show the viewer a white pigment (for example), and in the activated state the viewer may see red (for example); on the other hand, in the deactivated state the color display panel 411' may show the viewer a red pigment (for example), and in the activated state the viewer may see white (for example).

Figure 8:
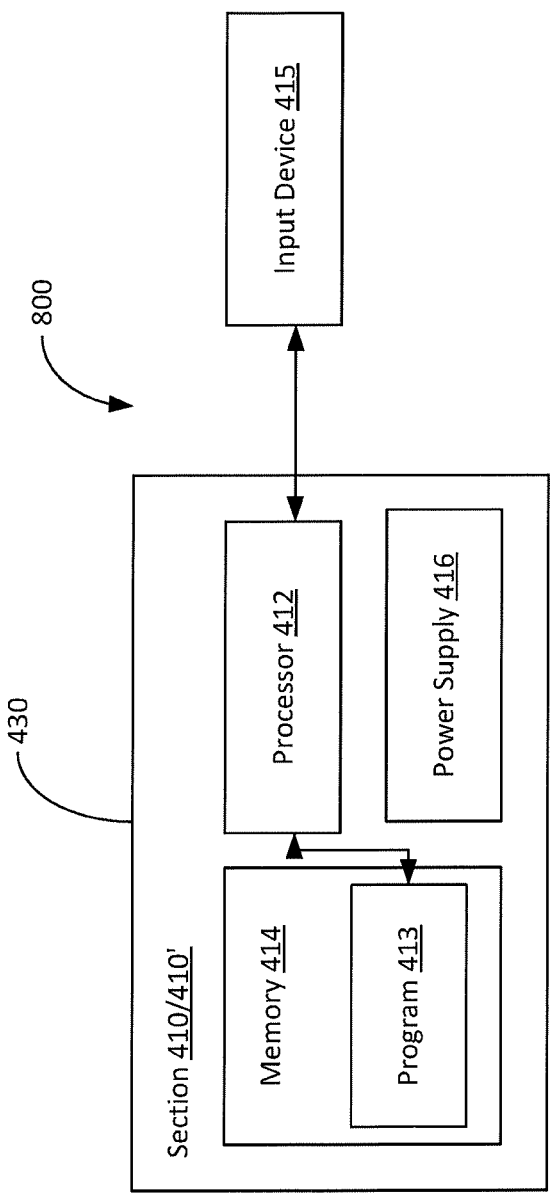
FIG. 8 is a schematic diagram of an exhibit system incorporating the display of FIGS. 4A and 4B.

A schematic illustration of a system 800 incorporating the exhibit 430 is shown in FIG. 8. The system 800 is substantially similar to the system 600, except as is shown and described or as would be inherent. Here, the processor 412 is in communication with an input device 415 which a user can use to control the sections 410 of the display 400. For example, the input device 415 may be a keyboard, mouse, tablet, etc. which may be used to input information into the program 213 to cause the sections 410 (and/or 410') to switch from a first colored state to a second colored state as described herein. In embodiments, the processor 412 of the display 400 communicates with the input device 415 over a network (e.g., wirelessly). A power supply 416 may be supplied to provide power to the system 800 to allow the sections 410 (and/or 410') to switch from the first colored state to the second colored state. As described above, once the sections 410 (and/or 410') switch to the second colored state, the sections 410 (and/or 410') may remain in that state until the processor 412 causes the sections 410 (and/or 410') to switch back to the first colored state. It shall be understood that the sections 410 (and/or 410') will remain in the second colored state even once power supply 416 is cut off. Therefore, the sections 410 (and/or 410') function as semi-permanent, rewritable memory. The sections 410 (and/or 410') may then be switched back to the first colored state (i.e., the memory may be re-written) by supplying power to the sections 410 (and/or 410') in connection with the programming 413 and/or information received from the input device 415.

Figure 5A:
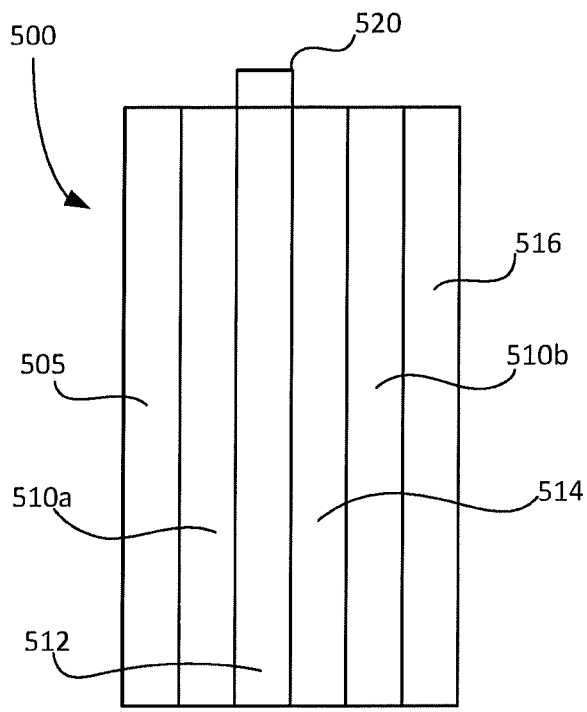
FIGS. 5A, 5B, and 5C illustrate a lighted display according to further embodiments of the invention.
Figure 5B:
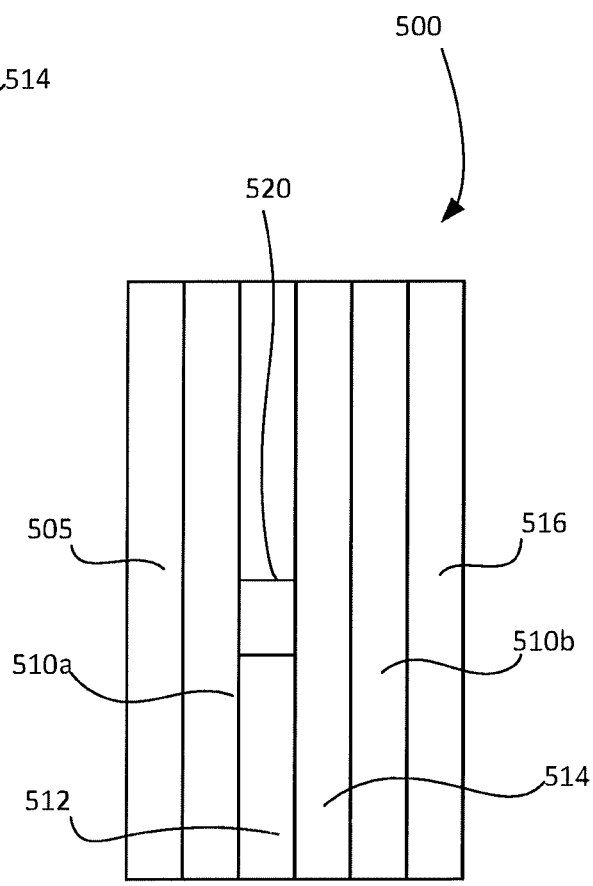
Figure 5C:
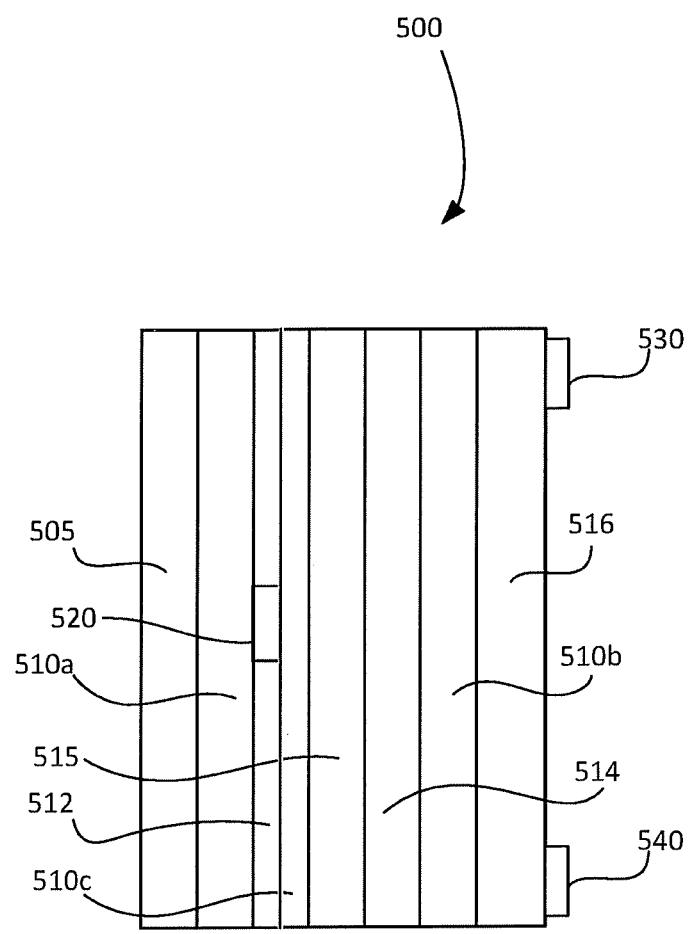

Moving on, FIGS. 5A, 5B, and 5C illustrate still another embodiment of a changing display 500. Here, the display 500 is configured as an optionally transflective display. In one embodiment, the exhibit 500 is layered in front of a panel 505, such as sheetrock. A layer of adhesive 510a is applied to the panel 505, and a substantially transparent layer 512, such as acrylic is attached to the panel 505 via the adhesive 510a. Optionally, a layer of sealer 514 is applied atop the substantially transparent layer 512 to seal any cracks in the transparent layer 512 and prevent damage thereto. A second layer of adhesive 510b may be applied atop the sealer 514, and a layer of tiles 516 may be adhered to the transparent layer 512 via the adhesive 510b.

A removable light 520 may be positioned atop the substantially transparent layer 312. When the light is activated, the substantially transparent layer 512 acts like a light pipe and distributes the light over the layer 512. In embodiments, it may be preferable for the tiles 516 to have one or more areas where light can escape. In some embodiments, the tiles 516 may themselves be somewhat transparent. Thus, it may be possible to provide a section of tile that is capable of being selectively illuminated. Importantly, the light 520 is removable such that it can be replaced if necessary or desired (e.g., to change the color of the light 520). In embodiments, as illustrated in FIG. 5B, the light 520 may be positioned at a side of the substantially transparent layer 512. It shall be understood that the light 520 may be configured to run along the entire, or substantially the entire, length (or the height) of the substantially transparent layer 512, as the case may be.

In embodiments, the substantially transparent layer 512 may be replaced by a color-display panel, such as panel 115 described above. Alternately, a color-display panel 515 may be layered in front of the substantially transparent layer 512, with an additional layer of adhesive 510c as necessary (FIG. 5C). In either case, the light 520 may be allowed to shine through, or partially shine through, the color-display panel 515. And, as described above, the color-display panel 515 may be activated to switch between predetermined colored states. Accordingly, the color-display panel 515 together with the light 520 may illuminate the tiles 516. Additionally, the color-display panel 515 may be selectively activated without the light 520 to alter the visual appearance of the tiles 516.

In embodiments, the light 520 may be a projection system for projecting onto the transparent layer 512. The projection system may project images onto the transparent layer. It shall be understood that the images need not be visible by the human eye. Images may also be defined as 'resonance imaged' as an energy matrix on a surface such as interference patterns due to vibrational forces. An energy matrix surface may be a fixed plane or a contoured non-planar shape. This energy matrix surface may also be an nontactile surface in free space that is a culmination and focal point of resonance imaged energy patterns. Therefore, the images may appear or culminate in mid-air (or in a vacuum).

Various sensors may be embedded within the layers of the system 500 for activating the light 520 (or projections system) and/or the color-display panel. For example, a touch sensor 530 may be embedded within the system 500 to recognize a first preprogrammed tap from a user which may cause the light 520 to turn on or off. A second preprogrammed tap from a user may activate the color-display panel 515, for example. Of course, the sensor 530 may be programmed to recognize alternative touch sequences as well. Other sensors 540, e.g., sensors such as cameras, accelerometers, microphones, IR detectors, etc. may further be incorporated within the system 300 for the purpose of controlling the various components of the system 500 (e.g. vibration, sound, gesture or voice controlled functionality).

Figure 9:
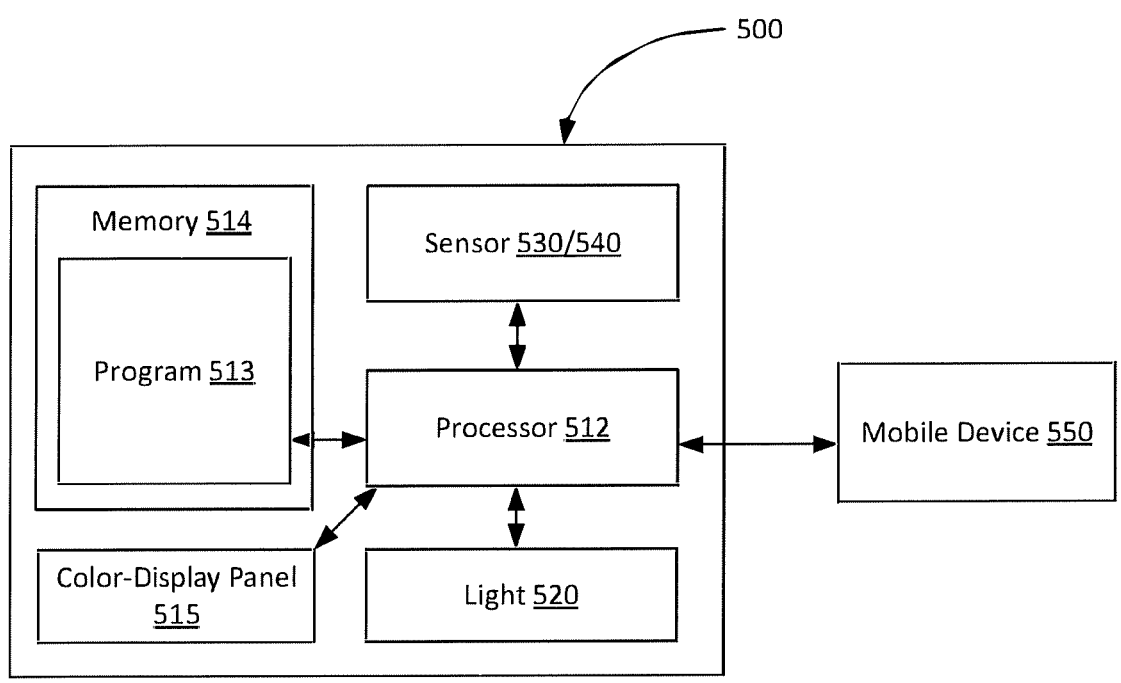
FIG. 9 is a schematic diagram of a display system incorporating the display of FIGS. 5A-5C.

One or more of the sensors 530, 540 may be in communication (e.g., wirelessly over a network) with a mobile device for controlling the functionality of the system 500, as illustrated in FIG. 9. The system 500 may further include a processor 512 communicatively coupled with programming 513 stored in memory 514, which programming 513 is operable in conjunction with the processor 512 to control the color-display panel 515 and the light 520. Accordingly, in embodiments, a user may interact with the mobile device 550 to store a predetermined schedule for activating the color-display panel 515 and/or the light 520 in the memory 514. The processor 512 accesses the stored program 513 and turns the color-display panel 515 and/or the light 520 on and off based on the instructions in the program 513. The user may be able to override the programming 513 via the mobile device 550, and/or reprogram the schedule.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. A color changing display system, comprising:
 a display apparatus having a plurality of sections, each section of the plurality of sections defining a color display panel; and
 a processor communicatively coupled to the display apparatus and a non-transitory computer memory, the computer memory having programming that, when executed by the processor, causes respective sections to be selectively activated in order to provide an alert to a user,
 wherein:
   the display apparatus is a payment card;
   each section of the plurality of sections comprises a plurality of static programmable electro-chromic particles, each particle having a plurality of first color pigments and a plurality of second color pigments disposed therein;
   the first color pigments are selectively stimulated to move between a first side of the particle and a second side of the particle, and the second color pigments are selectively stimulated to move oppositely between the second side of the particle and a first side of the particle; and
   each section of the plurality of sections is individually selectively activated by the processor;
   the plurality of sections comprises:
     a first section, wherein the first color pigments are white and the second color pigments are a first color;
     a second section, wherein the first color pigments are white and the second color pigments are a second color;
     a third section, wherein the first color pigments are white and the second color pigments are a third color;
     a fourth section, wherein the first color pigments are white and the second color pigments are a fourth color.

2. The display system of claim 1, where the selective stimulation of the first color pigments and the second color pigments occurs simultaneously.

3. The display system of claim 1, wherein the first section is configured to provide information about an account associated with the payment card.

4. The display system of claim 1, wherein the second section is configured to alert the user of possible fraud associated with the account associated with the payment card.

5. The display system of claim 1, wherein the third section is configured to alert the user of a low or zero balance.

6. The display system of claim 1, wherein the second color pigments of one of the first, second, third, and fourth sections are green and are configured to alert the user that a status is good.

7. The display system of claim 1, wherein the second color pigments of one of the first, second, third, and forth sections are yellow and configured to alert the user to call a service center.

8. The display system of claim 1, wherein the second color pigments of one of the first, second, third, and fourth sections are red and configured to alert the issue of an issue and dissuade using the payment card.

9. The display system of claim 1, wherein the second color pigments of one of the first, second, third, and fourth sections are blue and configured to alter the user of an availability of a preset trigger limit.

10. The display system of claim 1, where the selective stimulation of the first color pigments and the second color pigments occurs simultaneously.

11. The display system of claim 1, wherein:
 the first section is configured to provide information about an account associated with the payment card;
 the second section is configured to alert the user of possible fraud associated with the account associated with the payment card; and
 the third section is configured to alert the user of a low or zero balance.

12. The display system of claim 1 further comprising:
 a computer chip, wherein the computer chip authenticates transactions with the payment card and provides power to the plurality of sections.

13. The display system of claim 12, wherein the computer chip is in communication with a database to provide the computer chip with relevant information which is retrieved and analyzed by the processor, the processor causing respective sections to be switched from a default state to an alert state based on the information retrieved and analyzed by the processor.

14. The display system of claim 1, wherein one of the plurality of sections is configured to alert the user to coupons or sales that are relevant to the user's purchase.

15. The display system of claim 1, wherein the first color, the second color, the third color, and the fourth color are not the same.

16. The display system of claim 15, wherein the first color is green, the second color is yellow, the third color is red, and the fourth color is blue.

17. The display system of claim 16, wherein the processor communicates with an establishment to identify promotions available, and causes the respective section to switch from a default state to an alert state to alert the user to coupons or sales that are relevant to the user's purchase.

18. The display system of claim 16, wherein:
the green section is configured to alert the user that a status is good;
the yellow section is configured to alert the user to call a service center;
the red section is configured to alert the user of an issue to dissuade the user from using the payment card; and
the blue section is configured to alert the user of an availability of a preset trigger limit.

19. The display system of claim 1, wherein each of the first section, the second section, the third section, and the fourth section are independently activatable.

20. The display system of claim 19, wherein:
the first section is configured to alert the user that a status is good;
the second section is configured to alert the user to call a service center;
the third section is configured to alert the user of an issue to dissuade the user from using the payment card; and
the fourth section is configured to alert the user of an availability of a preset trigger limit.

* * * * *